US005150610A

United States Patent [19]

Myers

[11] Patent Number: 5,150,610

[45] Date of Patent: Sep. 29, 1992

[54] AUXILIARY STARTER SWITCH WITH ILLUMINATED GUARD

[75] Inventor: Dean E. Myers, South Solon, Ohio

[73] Assignee: MAC Tools, Inc., Washington Court House, Ohio

[21] Appl. No.: 688,456

[22] Filed: Apr. 22, 1991

[51] Int. Cl.[5] .......... G01M 19/00

[52] U.S. Cl. .......... 73/118.1; 200/43.03; 340/815.16

[58] Field of Search .......... 340/815.15, 815.16; 200/43.03, 43.18, 310, 311, 317, 304, 312, 313, 293.1, 334, 341, 345; 73/118.1

[56] References Cited

U.S. PATENT DOCUMENTS 3,320.801 5/1967 Rhindress, Jr. .......... 73/116

FOREIGN PATENT DOCUMENTS 599738 6/1960 Canada .......... 200/317

*Primary Examiner*—Jerry W. Myracle

*Attorney, Agent, or Firm*—Porter, Wright, Morris & Arthur

[57] ABSTRACT

In an auxiliary starter switch device, a guard for the auxiliary switch actuator and a small warning lamp and lens are combined in such a way that the guard itself contributes to the indicator warning. The guard is formed of a transparent or translucent material, and the lamp and lens (or an equivalent LED) is mounted in optically close-coupled arrangement with the guard. When the lamp is energized, the guard itself is substantially illuminated to expand the warning light area.

6 Claims, 1 Drawing Sheet

AUXILIARY STARTER SWITCH WITH ILLUMINATED GUARD

BACKGROUND OF THE INVENTION

This invention relates to auxiliary starter switches for use in automobile maintenance work or the like. Such switches are used by a mechanic during diagnostic or testing procedures, allowing him to energize the starter motor of a vehicle engine separately from the normal starting switch, which is usually incorporated in the key controlled ignition switch, while observing the engine with the engine hood open.

Switches for this purpose are per se well known, and comprise a housing in which a pushbutton normally open switch is mounted, and a pair of electrical conductors or leads extending from the contacts of the switch. At their other ends these leads have some form of quick attaching temporary connector, usually what is commonly known as "alligator" clips. To use the auxiliary switch, the mechanic simply attaches the clips respectively to a source of electrical power (e.g. a battery hot lead, positive in most systems) and to the energizing terminal of the starter motor solenoid, thus making a shunt circuit for the normal starting solenoid energizing circuit. Upon closing the normally open pushbutton switch, the starter solenoid is actuated to apply power to the starting motor.

Because of the nature of this operation, the mechanic must exercise caution in handling the auxiliary switch once it is temporarily connected, and various forms of guards have been provided to partially shield the switch button or actuator, thus minimizing the chance of the switch accidentally being closed. Also, to assist the mechanic, small indicator lights have been fitted to illuminate when the auxiliary switch circuit is attached to the engine starting circuit, thus warning the mechanic that the auxiliary switching circuit is armed, e.g. ready to operate. In many cases those units which have an indicator light are so positioned and designed that they may be obscured from an operator's view by his hand or, in some orientations, by the switch pushbutton.

SUMMARY OF THE INVENTION

In accordance with the present invention, the guard for the auxiliary switch actuator and the indicator light are combined in such a way that the guard itself contributes to the indicator warning. Thus, the guard is formed of a transparent or translucent material, and the indicator sub-miniature incandescent lamp fitted with a colored lens which is mounted in optically close-coupled arrangement with the alternatively. When the lamp is energized, the guard itself is substantially illuminated. This expands considerably the warning light area, without adding to the over-all size of the device, and utilizes the light conductive nature of this guard to particular advantage.

It is therefore the primary object of this invention to provided a unique guard for an auxiliary starting switch, which guard is optically coupled to a warning light indicating that the circuit including the auxiliary switch is energized.

Other objects and advantages of the invention will be apparent from the following description, the accompanying drawings and the appended claims.

DESCRIPTION OF THE PREFERRED EMBODIMENT

Figure 1:
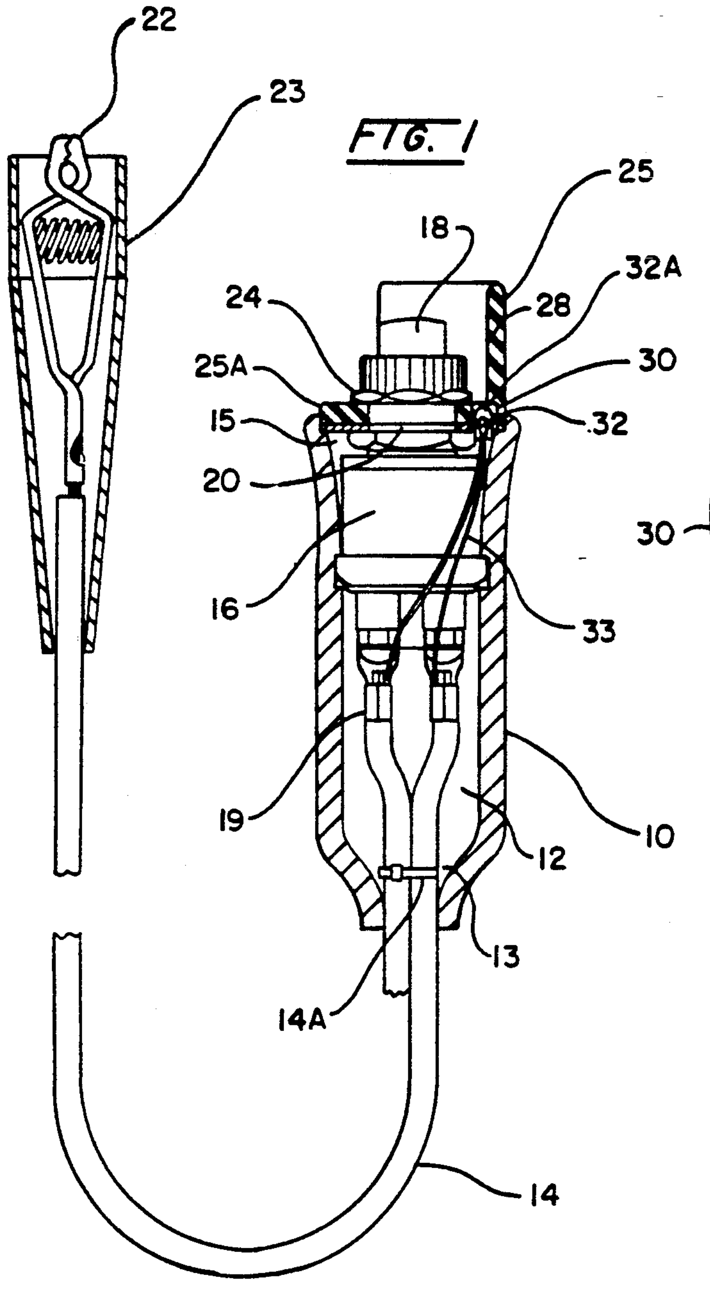
FIG. 1 is a cross-sectional view of the auxiliary switch device with the switch housing and actuator button shown in elevation, and with one lead illustrated including its attachment clip.
Figure 2:
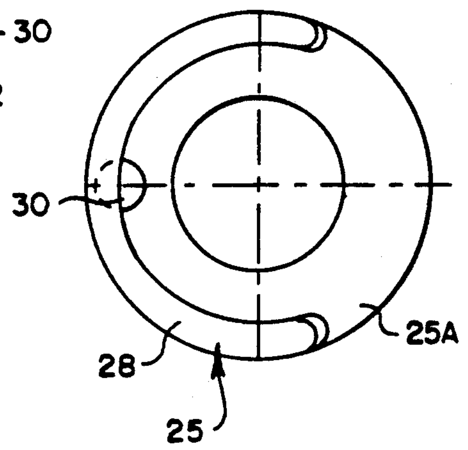
FIG. 2 a top view of the guard which is shown located around a part of the periphery of the switch actuator in FIG. 1.

The exterior housing of the device is indicated at 10, and includes an internal cavity 12 with a restricted end 13 through which the electrical leads 14 extend, being restrained within end 13 by a strain relief member 14A. An opposite enlarged end 15 supports and contains a conventional normally open electrical switch 16 having an actuator 18 in the form of a pushbutton which is typically spring urged to extend to an outer limit from switch 16.

A pair of external connectors 19 extend from switch 16, within cavity 12, and are connected to the leads 14 as shown. A ring 20 is press fitted or otherwise fixed into the housing end 15. Leads 14 are terminated to quick releasing clips 22, which are surrounded by flexible electrically insulating sheaths 23, only one of which is shown.

The body of switch 16 has a typical threaded extension, in which pushbutton 18 is slidably supported, and a pair of nuts 24 on this extension hold the switch 16 to ring 20 while also attaching the base 25A of a guard member 25 to the housing 10. As shown, the guard is a molded translucent or transparent plastic piece, having a circular apertured base 25A and an integral outwardly projecting wall 28 which extends beyond the outermost extension of pushbutton 18, and surrounds that button by more than 180°. It is therefore difficult to press pushbutton 18 accidentally, since the mechanic must insert a finger or thumb into the confines of guard member 25 so as to press against that pushbutton. Accidental dropping or bumping of housing 10 is unlikely to depress pushbutton 18, at least not enough to close switch 16. The guard may be molded of suitable material such as cellolose acetate, which is resistant to many automotive fluids, but other materials may be utilized so long as they have transparent or translucent light conductive property.

At the juncture of base 25A and wall 28 there is a small cavity 30 in which is placed a small incandescent lamp 32 fitted with a colored lens 32A having wires 33 which extend to the respective connectors 19. Thus, when the clips are applied to the starter circuit of an engine, there is power to the lamp, but due to its high resistance, there is not sufficient current passing through that circuit to energize the solenoid. A small LED may be utilized instead lamp and lens. The lamp glows and light therefrom is transmitted into and through the guard. This results in a warning light area much greater than the area of the lamp itself, and yet of acceptable intensity. Thus, there is a synergistic effect obtained by strategically locating the warning lamp in optically close-coupled relation to a translucent or transparent switch guard.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An auxiliary control switch including a housing and a manually actuatable control button on said switch extending from said housing, electrical leads connected to said switch and having clips for attachment to a starting motor control to allow temporary auxiliary actuation of the starting motor, a translucent guard member supported on said housing and extending partially about said control button to limit access thereto, a warning lamp connected to said leads separately from said switch and supported in optically close-coupled relation to said guard member, whereby when power is applied to said leads said guard member is illuminated by said lamp.

2. An auxiliary control switch as defined in claim 1, wherein said guard member is molded of cellulose acetate.

3. An auxiliary control switch as defined in claim 1, including a cavity formed in said guard member and said lamp being mounted in said cavity.

4. An auxiliary control switch as defined in claim 1, wherein said control switch is a normally open pushbutton actuated switch and said guard member extends partially around and beyond the path of motion of said pushbutton.

5. An auxiliary control switch as defined in claim 1, wherein said warning lamp is a sub-miniature incandescent lamp, and a colored lens fitted over said lamp.

6. An auxiliary control switch as defined in claim 1, wherein said warning lamp is an LED.

* * * * *